United States Patent
Steiner et al.

(10) Patent No.: US 9,226,333 B2
(45) Date of Patent: Dec. 29, 2015

(54) VIRTUALIZATION OF CONTROL PLANE FUNCTIONS OF A WIRELESS CORE PACKET NETWORK

(71) Applicants: Moritz M. Steiner, Montclair, NJ (US); Buvaneswari A. Ramanan, Scotch Plains, NJ (US); Bu Tian, Basking Ridge, NJ (US); Lawrence M. Drabeck, Oceanport, NJ (US); Georg Hampel, New York City, NY (US)

(72) Inventors: Moritz M. Steiner, Montclair, NJ (US); Buvaneswari A. Ramanan, Scotch Plains, NJ (US); Bu Tian, Basking Ridge, NJ (US); Lawrence M. Drabeck, Oceanport, NJ (US); Georg Hampel, New York City, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 277 days.

(21) Appl. No.: 13/912,658

(22) Filed: Jun. 7, 2013

(65) Prior Publication Data

US 2014/0362775 A1   Dec. 11, 2014

(51) Int. Cl.
*H04W 76/04* (2009.01)
*G06F 9/455* (2006.01)

(52) U.S. Cl.
CPC ......... *H04W 76/045* (2013.01); *G06F 9/45558* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,601,106 B1 | 7/2003 | Moberg et al. | |
| 6,606,303 B1 * | 8/2003 | Hassel et al. | 370/238 |
| 2003/0110276 A1 * | 6/2003 | Riddle | 709/230 |
| 2005/0086363 A1 * | 4/2005 | Ji | 709/235 |
| 2007/0147397 A1 * | 6/2007 | Aaron et al. | 370/401 |
| 2010/0322141 A1 * | 12/2010 | Liu et al. | 370/315 |

FOREIGN PATENT DOCUMENTS

WO   WO 2012/160465   11/2012
WO   WO 2013/030693    3/2013

OTHER PUBLICATIONS

Hampel, G., et al., "Applying Software-Defined Networking to the Telecom Domain," *16th IEEE Global Internet Symposium*, Apr. 14, 2013, pp. 3339-3344, XP03244120.
Kempf, J., et al., "Moving the Mobile Evolved Packet Core to the Cloud," *2012 International Workshop on Selected Topics in Mobile and Wireless Computing*, Oct. 2012, pp. 784-791, XP002717394.
"OpenFlow Switch Specification," *Open Networking Foundation*, Jun. 25, 2012, pp. 1-83, Version 1.3.0, XP002692656.
International Search Report and Written Opinion for international Patent Application Serial No. PCT/US2013/071365, mailed Feb. 12, 2014, consists of 12 unnumbered pages.
U.S. Appl. No. 13/691,317, "Software-Defined Network Overlay," filed Nov. 30, 2012.

* cited by examiner

*Primary Examiner* — Kerri Rose
(74) *Attorney, Agent, or Firm* — Wall & Tong, LLC

(57) ABSTRACT

A capability is provided for virtualizing control plane functions of a wireless core packet network (WCPN). A forwarding element (FE) is configured to provide a set of data plane functions of the WCPN. A virtual control element (VCE) is configured to provide a set of control plane functions of the WCPN. The VCE includes a set of virtual machines (VMs) where at least one of the VMs is configured to detect a condition associated with a tunnel, for a wireless terminal (WT), between the FE and a wireless access device (WAD) configured to serve the WT, and propagate, toward the FE, a message comprising a tunnel command configured to instruct the FE to at least one of install, remove, or modify a tunnel rule associated with the tunnel between the FE and the WAD. The tunnel enables the WT to access a packet data network (PDN).

22 Claims, 9 Drawing Sheets

VIRTUALIZATION OF CONTROL PLANE FUNCTIONS OF A WIRELESS CORE PACKET NETWORK

TECHNICAL FIELD

The disclosure relates generally to wireless communication networks and, more specifically but not exclusively, to virtualization of control plane functions of a wireless core packet network.

BACKGROUND

Long Term Evolution (LTE) is a standard for wireless communication of high-speed data for mobile phones and data terminals. LTE networks are typically composed of a radio access network (RAN) portion and a wireless core packet network portion that is typically referred to as the Evolved Packet Core (EPC). The RAN portion of an LTE network typically includes evolved NodeBs which provide an air interface for access to the LTE network by User Equipments (UEs). The EPC of an LTE network typically includes elements such as Serving Gateways (SGWs), Packet Data Network (PDN) Gateways (PGWs), Mobility Management Entities (MMEs), Policy and Charging Rules Functions (PCRFs), and the like.

SUMMARY OF EMBODIMENTS

Various deficiencies in the prior art may be addressed by embodiments for virtualizing control plane functions of a wireless core packet network.

In one embodiment, a virtual control element (VCE) includes a set of virtual machines (VMs) configured to provide a set of control plane functions of a wireless core packet network, and at least one of the VMs is configured to detect a condition associated with a tunnel, for a wireless terminal (WT), between a forwarding element (FE) of the wireless core packet network and a wireless access device (WAD) configured to serve the WT, and propagate, toward the FE, a message comprising a tunnel command configured to instruct the FE to install, remove, or modify a tunnel rule associated with the tunnel between the FE and the WAD.

In one embodiment, a method includes detecting, at a virtual control element (VCE) of a wireless core packet network, a condition associated with a tunnel, for a wireless terminal (WT), between a forwarding element (FE) of the wireless core packet network and a wireless access device (WAD) configured to serve the WT, and propagating, from the VCE toward the FE, a message comprising a tunnel command configured to instruct the FE to install, remove, or modify a tunnel rule associated with the tunnel between the FE and the WAD. The VCE includes set of virtual machines (VMs) configured to provide a set of control plane functions of the wireless core packet network.

In one embodiment, a computer-readable storage medium stores instructions which, when executed by a computer, cause the computer to perform a method. The method includes detecting, at a virtual control element (VCE) of a wireless core packet network, a condition associated with a tunnel, for a wireless terminal (WT), between a forwarding element (FE) of the wireless core packet network and a wireless access device (WAD) configured to serve the WT, and propagating, from the VCE toward the FE, a message comprising a tunnel command configured to instruct the FE to install, remove, or modify a tunnel rule associated with the tunnel between the FE and the WAD. The VCE includes set of virtual machines (VMs) configured to provide a set of control plane functions of the wireless core packet network.

In one embodiment, a system includes a forwarding element (FE) configured to provide a set of data plane functions of a wireless core packet network and a virtual control element (VCE) communicatively connected to the FE and configured to provide a set of control plane functions of the wireless core packet network. The VCE includes a set of virtual machines (VMs), where at least one of the VMs is configured to detect a condition associated with a tunnel, for a wireless terminal (WT), between the FE of the wireless core packet network and a wireless access device (WAD) configured to serve the WT, and propagate, toward the FE, a message comprising a tunnel command configured to instruct the FE to install, remove, or modify a tunnel rule associated with the tunnel between the FE and the WAD.

BRIEF DESCRIPTION OF THE DRAWINGS

The teachings herein can be understood by considering the following detailed description in conjunction with the accompanying drawings, in which.

To facilitate understanding, identical reference numerals have been used, where possible, to designate identical elements common to the figures.

DETAILED DESCRIPTION OF EMBODIMENTS

In general, a capability is provided in a wireless core packet network for virtualizing control plane functions of the wireless core packet network. The virtualization of the control plane functions of the wireless core packet network may be provided without virtualizing the data plane functions of the wireless core packet network. The control plane functions may be virtualized using a virtual control element (VCE) and data plane functions may be provided using a forwarding element (FE) which may be controlled by the VCE. The VCE may be provided using any suitable set of virtual resources (e.g., virtual machines (VMs), virtual memory resources, virtual storage resources, or the like) which may be provided using any suitable type of virtualization solution (e.g., a dedicated data center, a cloud-based computing environment, or the like). The VCE and FE may cooperate to support tunnels between one or more wireless access devices (WADs) of one or more radio access networks (RANs) associated with the wireless core packet network (where each WAD may support one or more wireless terminals (WTs)) and one or more packet data networks (PDNs). The VCE may be configured to detect a condition associated with a tunnel, for a WT, between the FE of the wireless core packet network and a WAD configured to support the WT, and to propagate, toward the FE, a message including a tunnel command configured to instruct the FE to install, remove, or modify a tunnel rule associated with the tunnel between the FE and the WAD for the WT. Various embodiments may be better understood by considering an exemplary wireless communication system configured to support virtualization of control plane functions of a wireless core packet network.

Figure 1:
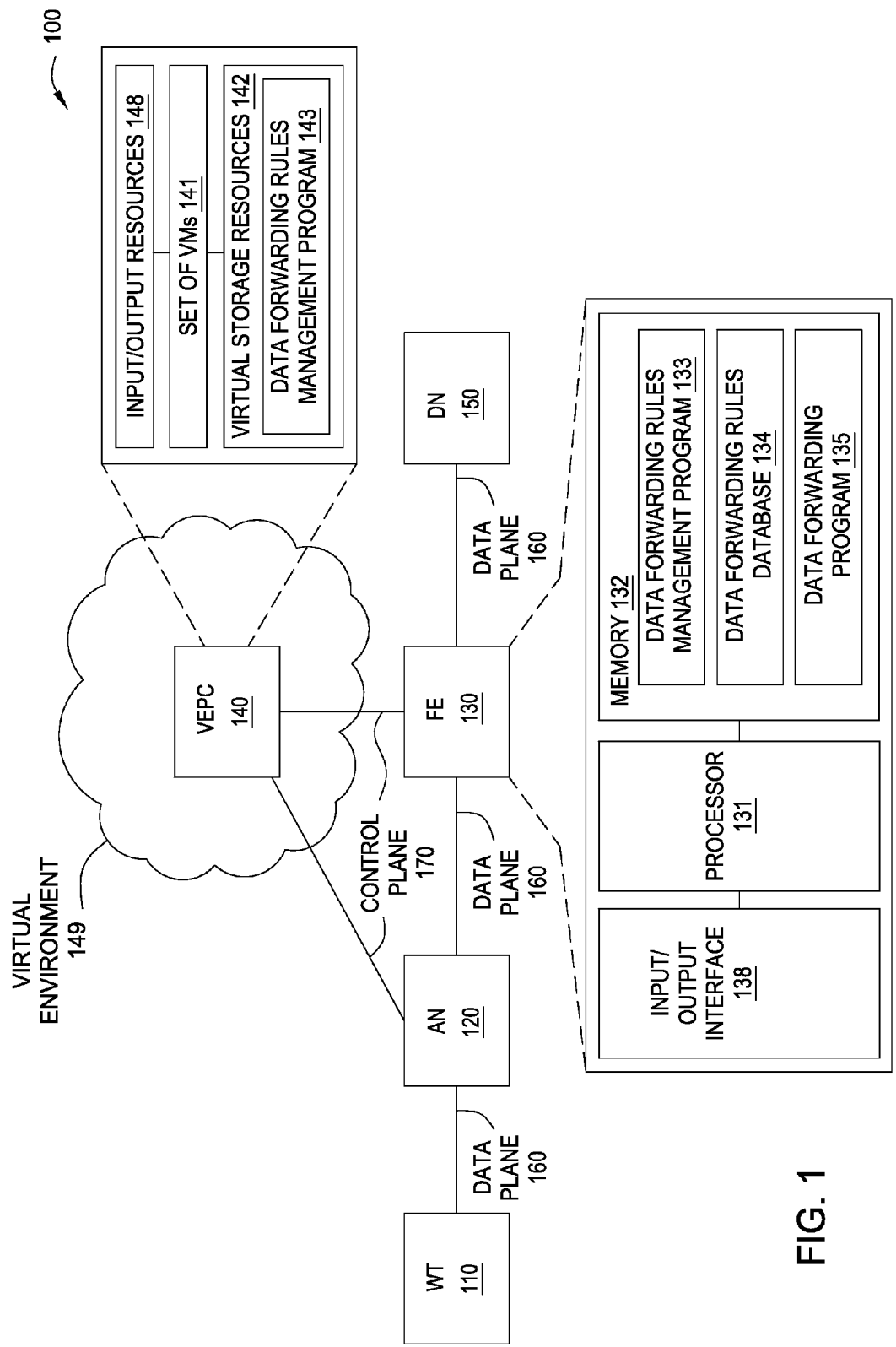
FIG. 1 depicts an exemplary wireless communication system configured to support virtualization of control plane functions of a wireless core packet network.

FIG. 1 depicts an exemplary wireless communication system configured to support virtualization of control plane functions of a wireless core packet network.

The wireless communication system (WCS) 100 includes a wireless terminal (WT) 110, an access node (AN) 120, a forwarding element (FE) 130, a virtualized control element (VCE) 140, and a data network (DN) 150.

The WT 110 is a wireless terminal configured to access AN 120 via wireless communications, including wireless uplink (UL) communications to AN 120 and wireless downlink (DL) communications from AN 120. The WT 110 is configured to communicate with DN 150 via AN 120 and FE 130, which may include upstream communications from WT 110 to DN 150 and downstream communications from DN 150 to WT 110. For example, the WT 110 may be smartphone, a tablet computer, a laptop computer, or the like.

The AN 120 is a wireless access node configured to support a wireless interface for a set of WTs (including WT 110, and other WTs which are omitted for purposes of clarity). The AN 120 is configured to support wireless UL communications from WT 110 and wireless DL communications to WT 110. The AN 120 also is configured to communicate with FE 130 to support communications between WT 110 and DN 150. The AN 120 is configured to support to communicate with VCE 140.

The FE 130 and VCE 140 are configured to provide wireless core packet network functions of a wireless core packet network for WCS 100. The FE 130 is a data forwarding element configured to support data plane functions of the wireless core packet network. The FE 130 may be an implementation of one or more nodes or functions that typically perform data plane functions of the wireless core packet network. The VCE 140 is a virtualized control element configured to support control plane functions of the wireless core packet network (e.g., identity management functions, session management functions, data forwarding control functions, mobility management functions, or the like, as well as various combinations thereof). The VCE 140 may be an implementation of one or more nodes or functions that typically perform control plane functions of the wireless core packet network. The VCE 140 is configured to control the operation of FE 130. The VCE 140 and FE 130 may cooperate to provide wireless core packet network functions using Software-Defined Networking (SDN), e.g., using a version of OpenFlow or any other suitable type of SDN-based or SDN-like solution.

The FE 130 is configured to support data communications between WT 110 and DN 150 via forwarding of packets between AN 120 and DN 150. The FE 130 includes data forwarding rules used by FE 130 to forward data packets between AN 120 and DN 150. The FE 130 is configured to install data forwarding rules and remove data forwarding rules based on instructions received from VCE 140. The FE 130 is configured to receive packets associated with WT 110 and determine forwarding of the received packets based on the data forwarding rules maintained by FE 130 for WT 110. The FE 130 may be configured to provide various other data plane functions of a wireless core packet network.

In at least some embodiments, as depicted in FIG. 1, FE 130 includes a processor 131, a memory 132, and an input/output interface 138, where memory 132 and input/output interface 138 are communicatively connected to processor 131. The memory 132 includes a data forwarding rules management program 133, a data forwarding rules database 134, and a data forwarding program 135. The data forwarding rules management program 133 may be executed by processor 131 to control the set of data forwarding rules maintained in data forwarding rules database 134 (e.g., to control installation of data forwarding rules into and removal of data forwarding rules from data forwarding rules database 134 based on instructions received from VCE 140). The data forwarding rules database 134 stores data forwarding rules for WT 110 (as well as for any other WTs for which VCE 140 and FE 130 provide wireless core packet network functions, which are omitted for purposes of clarity). The data forwarding program 135 may be executed by processor 131 to provide forwarding of data packets based on data forwarding rules in data forwarding rules database 134 (e.g., processor 131 is configured to receive packets associated with WT 110 and determine forwarding of the received packets based on the data forwarding rules maintained in the data forwarding rules database 134 for WT 110). The processor 131 also may be configured to perform various other functions depicted and described herein as being provided by FE 130. It will be appreciated that, although omitted from FIG. 1 for purposes of clarity, in at least some embodiments FE 130 also may be implemented using virtual resources.

The VCE 140 is configured to control the operation of FE 130 in supporting data communications between WT 110 and DN 150 via forwarding of packets between AN 120 and DN 150. The VCE 140 is configured to control the operation of FE 130 by controlling the data forwarding rules for WT 110 that are maintained by FE 130. The VCE 140 may control the installation of data forwarding rules on FE 130 and the removal of data forwarding rules from FE 130. The VCE 140 may install data forwarding rules on FE 130 and remove data forwarding rules from FE 130 in response to various conditions and events. The VCE 140 may install a data forwarding rule for WT 110 on FE 130 by determining the data forwarding rule and propagating the data forwarding rule to FE 130 for storage on FE 130 and use by FE 130 in forwarding packets associated with WT 110. The VCE 140 may remove a data forwarding rule for WT 110 from FE 130 by identifying the data forwarding rule and sending an instruction to FE 130 for causing FE 130 to remove the data forwarding rule from FE 130. The VCE 140 may be configured to provide various other data plane functions of a wireless core packet network.

In at least some embodiments, as depicted in FIG. 1, VCE 140 may be composed of virtual resources including a set of virtual machines (VMs) 141, virtual storage resources 142, and input/output resources 148, where virtual storage resources 142 and input/output resources 148 are communicatively connected to the set of VMs 141. The virtual storage resources 142 include a data forwarding rules management program 143. The data forwarding rule management program 143 may be executed by one or more VMs in the set of VMs 141 to control installation of data forwarding rules on FE 130 and removal of data forwarding rules from FE 130. The set of VMs 141 also may be configured to perform various other functions depicted and described herein as being provided by VCE 140. It will be appreciated that the virtual resources of VCE 140 may be provided using any suitable virtual resources architecture (e.g., using virtual resources of a dedicated data center, using cloud-based virtual resources, or the like, as well as various combinations thereof).

As described herein, the one or more data forwarding rules for WT 110 that are determined by VCE 140 and maintained by FE 130 may include one or more upstream data forwarding rules for use by FE 130 in forwarding of data packets in the upstream direction from WT 110 toward DN 150 and one or more downstream data forwarding rules for use by FE 130 in forwarding of data packets in the downstream direction from DN 150 toward WT 110. In the case of an upstream data forwarding rule, for example, the upstream data forwarding rule may specify that a data packet received from WT 110 via AN 120 is to be forwarded toward DN 150. In the case of a downstream data forwarding rule, for example, the downstream data forwarding rule may specify that a data packet received from DN 150 and intended for WT 110 is to be forwarded toward AN 120 for delivery to WT 110. In at least some embodiments, in which FE 130 is configured to operate as a tunnel endpoint of tunnels between FE 130 and AN 120 for WT 110, the data forwarding rules for WT 110 that are maintained by FE 130 may be referred to as tunnel rules for WT 110. For example, where a tunnel rule for WT 110 is for an UL tunnel from AN 120 to FE 130 (for transport of data packets in an upstream direction from WT 110 to DN 150), the tunnel rule may indicate that the FE 130 decapsulate data packets received via the UL tunnel and forward the decapsulated data packets toward the DN 150. Similarly, for example, where a tunnel rule for WT 110 is for a DL tunnel from FE 130 to AN 120 (for transport of data packets in a downstream direction from DN 150 to WT 110), the tunnel rule may indicate that FE 130, in response to receiving data packets from DN 150 that are intended for WT 110, encapsulate the data packets for tunneling of the data packets to AN 120 for delivery to WT 110. In at least some such embodiments, in which FE 130 is an endpoint of a tunnel between AN 120 and FE 130 for WT 110, the tunnel may have associated therewith a tunnel endpoint identifier (TEID) that identifies FE 130 as the endpoint of the tunnel at the wireless core packet network. It will be appreciated that the types of tunnels supported may depend on the type of wireless core packet network being provided by FE 130 and VCE 140 (e.g., use of General Packet Radio Service (GPRS) Tunneling Protocol (GTP) tunnels in UMTS and LTE networks).

The VCE 140 is implemented in a virtual environment 149, while FE 130 remains outside of virtual environment 140. The virtual environment 149 may be any suitable type of environment for virtualizing a control element using virtual resources (e.g., a network-hosted virtual computing environment, a cloud-based computing environment, or the like). The virtual resources of virtual environment 149 may include any suitable set of virtual resources (e.g., virtual machines (VMs), virtual memory resources, virtual storage resources, or the like). The virtualization of VCE 140 without an associated virtualization of FE 130 enables the scaling of VCE 140 (and, therefore, the control plane of the wireless core packet network) and the scaling of FE 130 (and, therefore, the data plane of the wireless core packet network) to be performed independently.

As depicted in FIG. 1, FE 130 is configured to support data plane functions of a wireless core packet network, and the data plane of WCS 100 is depicted as data plane 160, which includes a path between WT 110 and AN 120, a path between AN 120 and FE 130, and a path between FE 130 and DN 150. As further depicted in FIG. 1, VCE 140 is configured to support control plane functions of a wireless core packet network, and the control plane of WCS 100 is depicted as control plane 170, which includes a path between VCE 140 and AN 120 and a path between VCE 140 and FE 130.

The DN 150 is a data network which may include or support various devices which may communicate with WT 110. For example, DN 150 may be the Internet, a private data network, or any other suitable type of packet data network which may be accessed by WT 110 via AN 120 and the wireless core packet network provided by FE 130 and VCE 140. For example, DN 150 may provide paths to other WTs (omitted for purposes of clarity) with which WT 110 may communicate, servers to which WT 110 may upload data or from which WT 110 may download data, or the like, as well as various combinations thereof.

The WCS 100 may be any suitable type of wireless communication network, such as a Third Generation Partnership Project (3GPP) Universal Mobile Telecommunications System (UMTS) network, a Long Term Evolution (LTE) network, or the like. For example, in a UMTS network, WT 110 may be a UE, AN 120 may be a NodeB, FE 130 may be configured to provide data plane functions of various nodes (e.g., Serving GPRS Support Nodes (SGSNs), Gateway GPRS Support Nodes (GGSNs), or the like), and VCE 140 may be configured to provide control plane functions of various nodes (e.g., SGSNs, GGSNs, or the like). For example, in an LTE network, WT 110 may be a UE, AN 120 may be an evolved NodeB (eNodeB), FE 130 may be configured to provide data plane functions of various nodes (e.g., Serving Gateways (SGWs), Packet Data Network (PDN) Gateways (PGWs), or the like), and VCE 140 may be configured to provide control plane functions of various nodes (e.g., SGWs, PGWs, Mobility Management Entities (MMEs), or the like). An exemplary embodiment of FIG. 1 in which WCS 100 is an LTE-based WCS is depicted and described with respect to FIG. 2.

Figure 2:
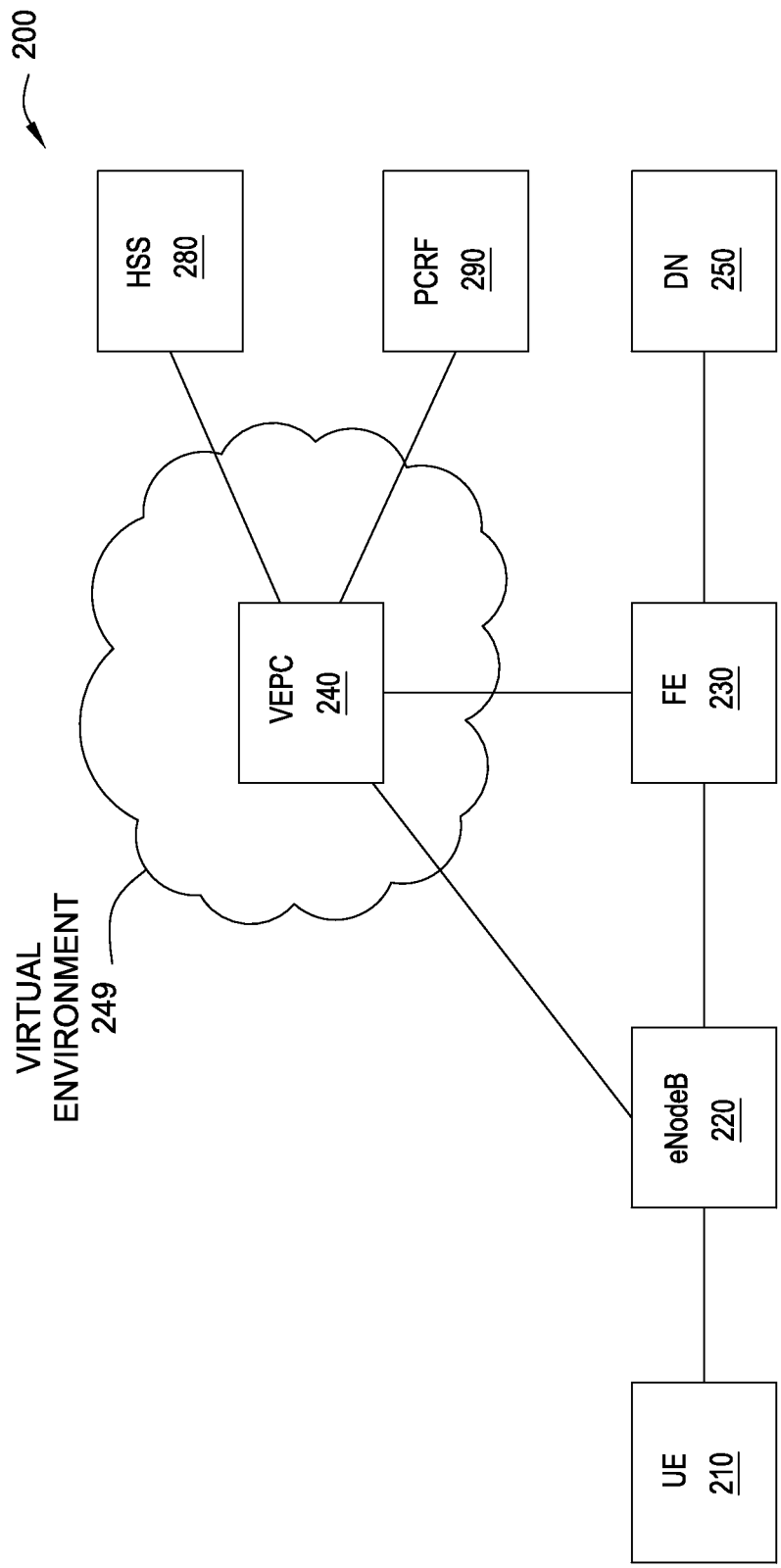
FIG. 2 depicts an exemplary Long Term Evolution (LTE) communication system configured to support virtualization of control plane functions of an Evolved Packet Core (EPC) network.

FIG. 2 depicts an exemplary Long Term Evolution (LTE) wireless communication system configured to support virtualization of control plane functions of an Evolved Packet Core (EPC) network.

The LTE communication system 200 includes a UE 210, an eNodeB 220, an FE 230, a VEPC 240, a DN 250, a Home Subscriber Server (HSS) 280, and a Policy and Charging Rules Function (PCRF) 290. It will be appreciated that the arrangement and operation of UE 210, eNodeB 220, FE 230, VEPC 240, and DN 250 is similar to that of WT 110, AN 120, FE 130, VCE 140, and DN 150, respectively, although it will be appreciated that the elements of LTE communication system 200 of FIG. 2 provide an LTE-based embodiment of the WCS 100 of FIG. 1. The HSS 280 and PCRF 290 may be communicatively connected to VEPC 240 (as illustrated in FIG. 2) or the functions of one or both of HSS 280 and PCRF 290 may be implemented within VEPC 240 (omitted for purposes of clarity). The typical operation of an HSS and a PCRF within an LTE network will be understood by one skilled in the art.

The FE 230 supports data plane functions of the EPC network and the VEPC 240 supports control plane functions of the EPC network. For example, FE 230 may support data plane functions typically provided by SGWs and PGWs of an EPC network. For example, VEPC 240 may support control plane functions typically provided by SGWs, PGWs, and MMEs of an EPC network (and, thus, reference may be made herein to an SGW element of VEPC 240, a PGW element of VEPC 240, and an MME element of VEPC 240). The VEPC 240 is configured to communicate using the various protocols typically used by SGWs, PGWs, and MMEs of an EPC network, such that VEPC 240 may interact with eNodeB 120 and other elements of LTE communication systems. It will be appreciated that merging of control plane functions of SGWs, PGWs, and MMEs of an EPC network into VEPC 240 enables a fewer number of states (or perhaps even only a single state) to be maintained for UE 210 at VEPC 240, such that signaling transactions that are typically required between the SGWs, PGWs, and MMEs of an EPC network (i.e., in the absence of embodiments of VEPC 240) may be reduced or even minimized.

The LTE communication system 200 may support various functions and procedures which may result in establishment of tunnels between eNodeB 220 and FE 230 (and, thus, which may trigger VEPC 240 to determine tunnel rules for FE 230 and to install the determined tunnel rules in FE 230) or termination of tunnels between eNodeB 220 and FE 230 (and, thus, which may trigger VEPC 240 to remove tunnel rules from FE 230). Two exemplary procedures which may result in establishment of tunnels for UE 210 in LTE communication system 200 (and, thus, installation of corresponding tunnel rules in FE 230 by VEPC 240 for UE 210) are depicted and described with respect to FIGS. 3A-3C (for a Network Attachment Procedure) and FIGS. 4A-4B (for a Service Request Procedure). It will be appreciated that installation of tunnel rules in FE 230 by VEPC 240 or removal of tunnel rules from FE 230 by VEPC 240 may be initiated based on various other conditions (e.g., other procedures, events, or the like).

Figure 3A:
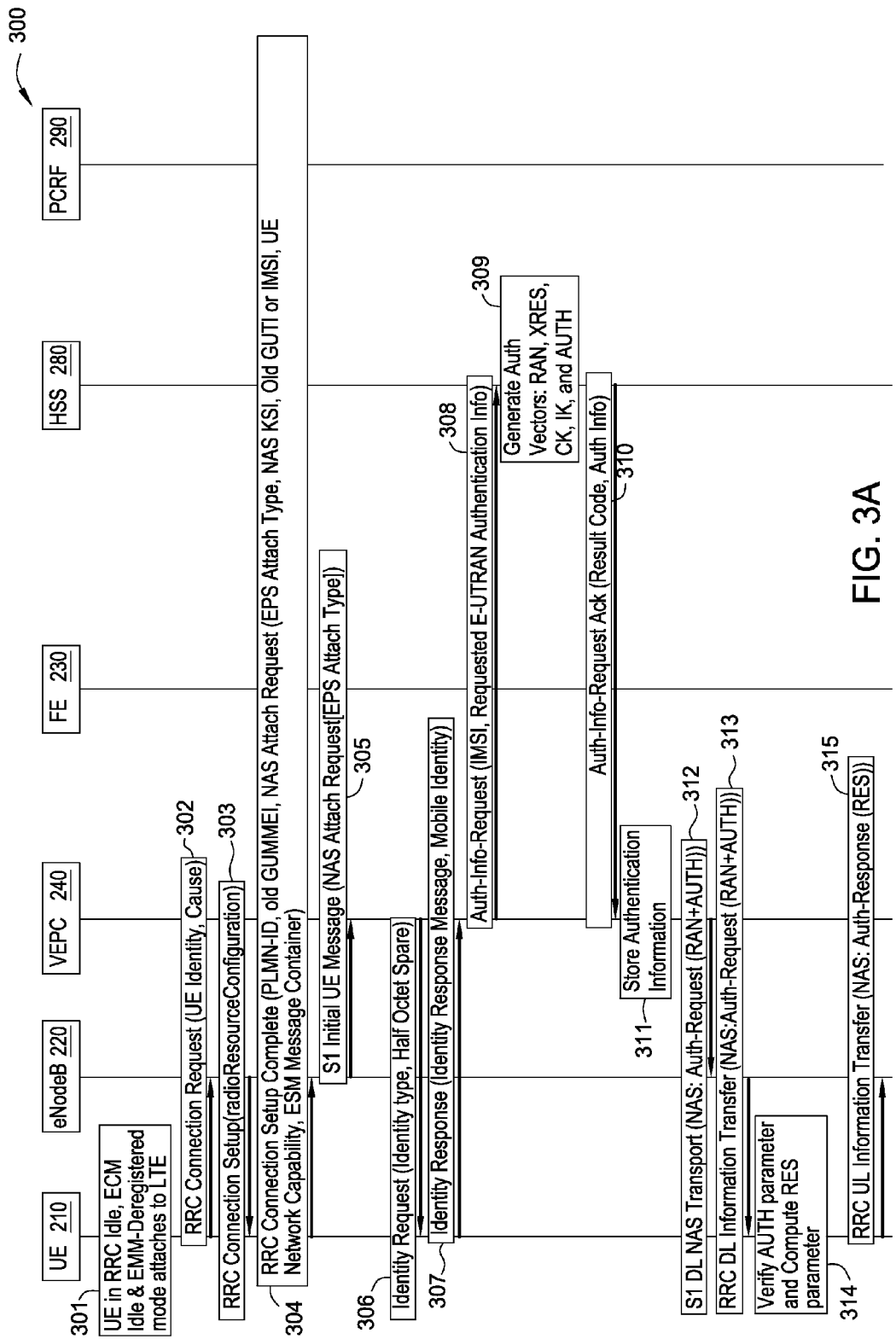
FIGS. 3A-3C depict an exemplary message flow for a Network Attachment Procedure in the LTE communication system of FIG. 2.
Figure 3B:
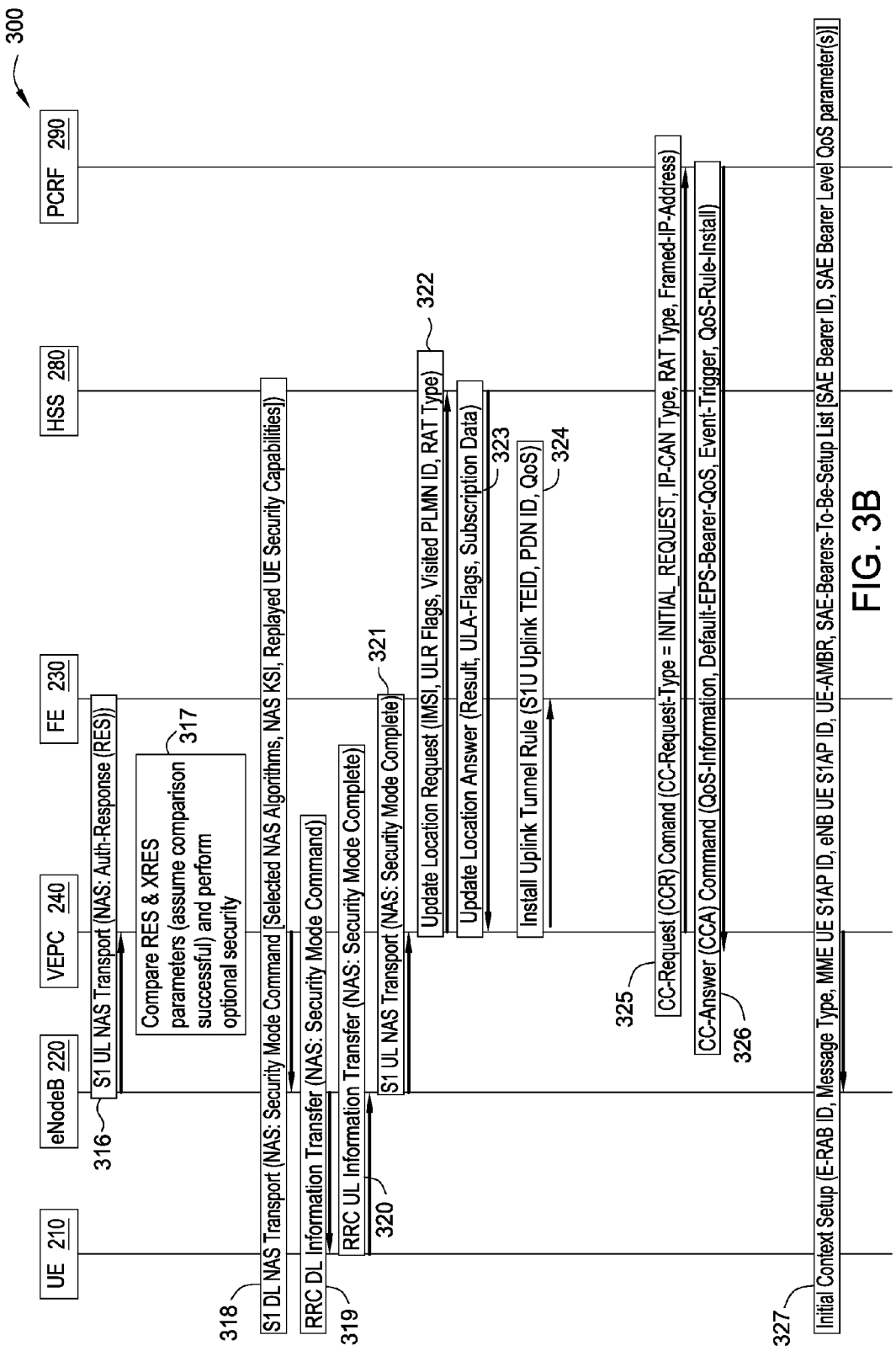
Figure 3C:
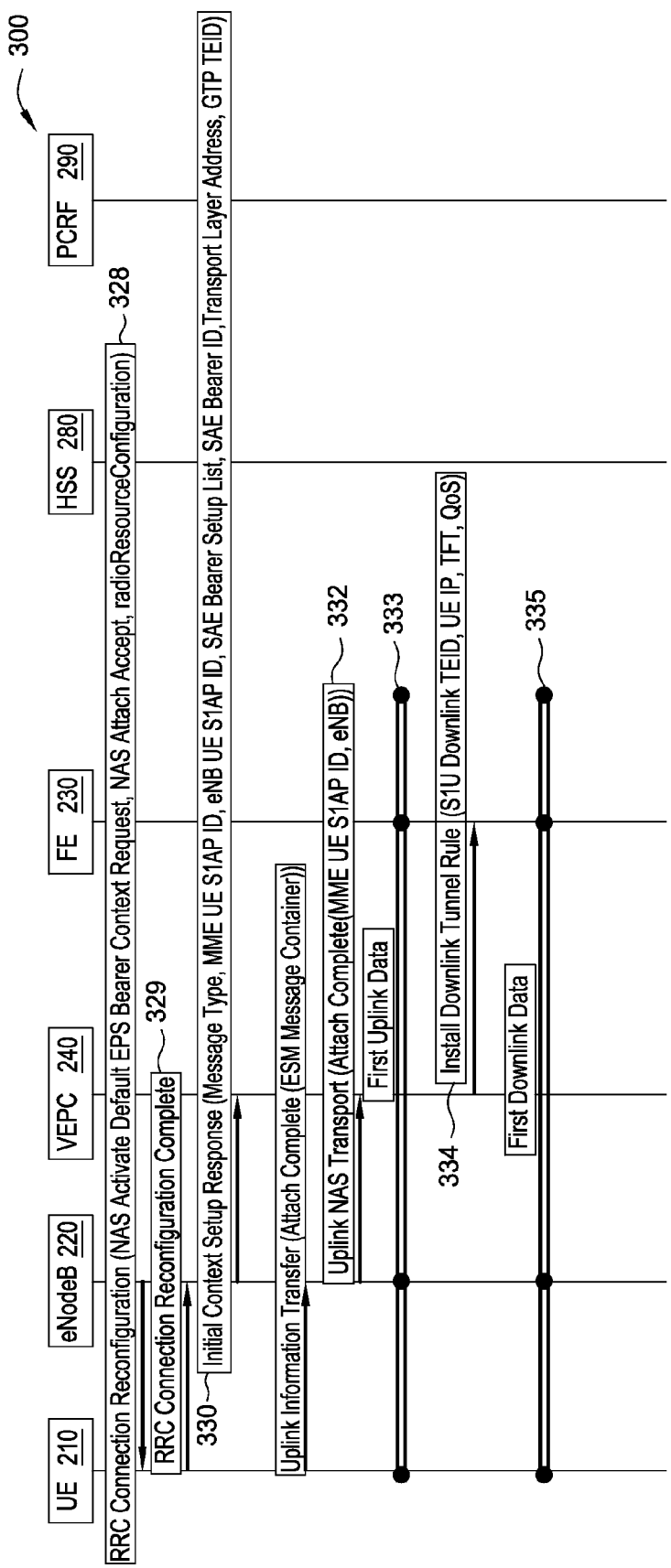

FIGS. 3A-3C depict an exemplary message flow for a Network Attachment Procedure in the LTE communication system of FIG. 2. In general, UE 210 may register with LTE communication system 200 in order to receive services (e.g., services requiring registration of UE 210). This type of registration is typically referred to as Network Attachment and may be performed using a Network Attachment Procedure. In general, always-on IP connectivity for UE 210 (or any UE of the Evolved Packet System (EPS)) may be enabled by establishing a default EPS bearer for UE 220 during Network Attachment. The predefined Policy and Charging Control (PCC) rules for the default bearer may be maintained by VEPC 240 (e.g., since, as described herein, VEPC 240 is configured to provide the control plane functions of the SGW and PGW elements, as well as the functions of the MME element). The PCC rules applied to the default EPS bearer may be predefined in and activated by the PGW element of VEPC 240. The Network Attachment Procedure may trigger one or more Dedicated Bearer Establishment procedures to establish one or more dedicated EPS bearer(s) for UE 210. During the Network Attachment Procedure, UE 210 may request an IP address allocation (which may be provided by VEPC 240).

At step 301, UE 210 attaches to eNodeB 220 while in the Radio Resource Control (RRC) Idle mode, EPS Connection Management (ECM) Idle mode, and EPS Mobility Management (EMM) Deregistered mode.

At steps 302 and 303, UE 210 and eNodeB 220 exchange signaling to set up an RRC connection. At step 302, UE 210 sends an RRC Connection Request message (e.g., including UE Identity and Cause) to eNodeB 220. At step 303, eNodeB 220 sends an RRC Connection Setup message (e.g., including Radio Resource Configuration Information) to UE 210. The setup of an RRC connection in this manner may be better understood by way of reference to Section 5.3.3 of 3GPP TS 36.331.

At step 304, UE 210 initiates the Network Attach Procedure by sending an Attach Request to eNodeB 220. The Attach Request may be in the form of an RRC Connection Setup Complete message, which may include RRC parameters (e.g., including the selected network (e.g., Public Land Mobile Network (PLMN) Identifier (PLMN-ID) and old Globally Unique Mobility Management Entity Identifier (GUMMED), and Non-Access Stratus (NAS) Attach Request parameters (e.g., EPS Attach Type, NAS Key Set Identifier (KSI), old Globally Unique Temporary Identifier (GUTI) or International Mobile Subscriber Identity (IMSI), UE Network Capability, and EPS Session Management (ESM) Message Container).

At step 305, eNodeB 220 derives the VEPC (illustratively, VEPC 240) for UE 210 and sends an Attach Request to the derived VEPC (again, VEPC 240). The eNodeB 220 derives the VEPC from the RRC parameters (e.g., the selected network and the old GUMMEI) in the Attach Request of the RRC Connection Setup Complete message (step 304). It is noted that, if the VEPC derived by eNodeB 220 is not associated with eNodeB 220 or the old GUMMEI is not available, eNodeB 220 may select the VEPC for UE 210 as described in Clause 4.3.8.3 of 3GPP TS 23.401. The eNodeB 220 sends the Attach Request to VEPC 240 as part of an S1 Initial UE Message.

At steps 306-321, various identity, authorization, and security procedures between VEPC 240 (e.g., the MME element of VEPC 240) and UE 210 are performed. The various identity, authorization, and security procedures between VEPC 240 may rely on interactions with the HSS 280. The various identity, authorization, and security procedures may be performed substantially as described with respect to the corresponding steps and functions of procedures 4 and 5a of Section 5.3.2.1 of 3GPP TS 23.401.

At step 306, VEPC 240 sends an Identity Request message (e.g., including Identity Type and Half Octet Spare) to UE 210 (when the identity of UE 210 is unknown).

At step 307, UE 210 responds to the Identity Request message by sending an associated Identity Response message (e.g., including Identity Response Message indicator and Mobile Identity of UE 210) to VEPC 240.

At steps 308-311, VEPC 240 obtains authorization information from HSS 280. At step 308, VEPC 240 sends an Authentication Information Request (Auth-Info-Request) message (e.g., including IMSI and Requested E-UTRAN Authentication Information) to HSS 280. At step 309, HSS 280 generates one or more authentication vectors (e.g., including Random Authentication (RAND), Expected Response (XRES), Ciphering Key (CK), Integrity Key (IK), and Authentication Token (AUTH) parameters). At step 310, HSS 280 sends an Authentication Information Request Acknowledgment (Auth-Info-Request Ack) message (e.g., including Result Code and Authentication Information) to UE 210. At step 311, VEPC 240 stores the Authentication Information received in the Authentication Information Request Acknowledgment message.

At steps 312-317, VEPC 240 and UE 210 authenticate each other. At step 312, VEPC 240 sends an S1U DL NAS Transport message (e.g., including NAS: Auth-Request (RAN+AUTH)) to eNodeB 220. At step 313, eNodeB 220 sends an RRC DL Information Transfer message (e.g., including NAS: Auth-Request (RAN+AUTH), from the S1U DL NAS Transport message) to UE 210. At step 314, UE 210 verifies the AUTH parameter and computes a RES parameter. At step 315, UE 210 sends an RRC UL Information Transfer message (e.g., including NAS: Auth-Response (RES)) to eNodeB 220. At step 316, eNodeB 220 sends an S1U UL NAS Transport message (e.g., including NAS: Auth-Response (RES)) to VEPC 240. At step 317, VEPC 240 compares the XRES parameter received from HSS 280 and the RES parameter received from UE 210 in order to authenticate UE 210 (and, optionally, may perform additional security measures).

At steps 318-321, a NAS Security context is established with UE 210. At step 318, VEPC 240 sends an S1U DL NAS Transport message (e.g., including NAS: Security Mode Command [Selected NAS Algorithms, NAS KSI, and Replayed UE Security Capabilities]) to eNodeB 220. At step 319, eNodeB 220 sends an RRC DL Information Transfer message (e.g., including NAS: Security Mode Command) to UE 210. At step 320, UE 210 sends an RRC UL Information Transfer message (e.g., including NAS: Security Mode Complete) to eNodeB 220. At step 321, eNodeB 220 sends an S1U UL NAS Transport message (e.g., including NAS: Security Mode Complete) to VEPC 240.

At steps 322-323, a Location Update Procedure is performed. At step 322, VEPC 240 sends an Update Location Request message (e.g., including IMSI of UE 210, Update Location Request (ULR) Flags, Visited PLMN ID, and Radio Access Technology (RAT) Type) to HSS 280. At step 323, HSS 280 sends an Update Location Answer message (e.g., including Result, ULA-Flags, and Subscription Data (e.g., PGW Fully Qualified Domain Name (FQDN), Mobile Subscriber Integrated Services Digital Network-Number (MSISDN), PDN Type [IPv6]), or the like). The Location Update Procedure may be performed as substantially described in 3GPP TS 29.272. It is noted that the Subscription Data includes the profile(s) for the subscribed APN(s), and that the PGW FQDN is explicit/redundant information that is present in VEPC 240 for backwards compatibility (and is most likely the same IP address as the IP address that is configured for VEPC 240). It is further noted that steps 322 and 323 are similar to steps 8 through 11 of Section 5.2.3.1 of 3GPP TS 23.401. It is further noted that, unlike in TS 23.401, use of VEPC 240 may obviate the need for the Create Session Request procedure that is typically performed between the SGW and the MME and between the SGW and the PGW (since the SGW, PGW, and MME functions are implemented within VEPC 240) and, thus, may obviate the need for VEPC 240 to support steps 12, 13, 15, and 16 of Section 5.3.2.1 of 3GPP TS 23.401.

At step 324, VEPC 240 installs an UL tunnel rule for UE 210 on FE 230. The VEPC 240 determines that an UL tunnel rule for UE 210 is to be installed on FE 230. The VEPC 240 determines the UL tunnel rule for UE 210, which may include determining UL tunnel information associated with the UL tunnel for which the UL tunnel rule is to be installed. The UL tunnel information describes the UL tunnel rule for UE 210. The UL tunnel information describing the UL tunnel rule may be determined from one or more signalling messages received by VEPC 240. For example, the UL tunnel information may include an S1U UL TEID, a PDN Identifier, and one or more QoS parameters. The VEPC 240 sends the UL tunnel rule to FE 230, which receives and stores the UL tunnel rule for UE 210. The VEPC 240 may send the UL tunnel rule to FE 230 by sending a message that includes a tunnel installation command configured to instruct the FE 230 to install the UL tunnel rule for UE 210. The UL tunnel rule installed on FE 230 for UE 210 may be used by FE 230 for handling packets received from UE 210 via eNodeB 220. For example, the UL tunnel rule installed on FE 230 for UE 210 may instruct the FE 210 to terminate the UL tunnel for UE 210 at FE 230 by decapsulating packets received from UE 210 via the UL tunnel between eNodeB 220 and FE 230 and forwarding the decapsulated packets toward an associated data network (which is omitted for purposes of clarity). The VEPC 240 may send the UL tunnel rule to FE 230 using an SDN protocol (e.g., OpenFlow or other suitable SDN protocol) or an SDN-based or an SDN-like protocol.

In at least some embodiments, an extension of the OpenFlow protocol may be used by VEPC 240 to send the UL tunnel rule for UE 210 to FE 230.

An exemplary message format for a message using an extension of an OpenFlow protocol to send the UL tunnel rule for UE 210 to FE 230 follows:

```
00069|tunnel|install new flow 000000000001
"flow_mod{table="0", cmd="add", cookie="0x0", mask="0x0",
idle="0", hard="0", prio="32768", buf="0", port="any",
group="any", flags="0x1", match=oxm{teid="35221864",
ipv4_dst="10.202.233.3", udp_dst="2152", eth_type=0x"800"},
insts=[apply{acts=[gtp_pop{eth="0x0800"},
set_field{field:eth_src="00:00:00:00:00:02"},
set_field{field:eth_dst="00:e0:8f:0d:88:a8"}, out{port="2"}]}]}"
```

It will be appreciated that the exemplary message above instructs FE 230 to maintain an UL tunnel rule indicative that packets received from the UE 210 and having the specified TEID (illustratively, 35221864) are forwarded toward the data network (e.g., toward a device associated with the data network and having destination Ethernet address 00:e0:8f:0d:88:a8).

An exemplary flow rule format for an UL tunnel rule that is installed by FE 230 for the UL tunnel of UE 210 based on the exemplary message format above follows:

```
{type="flow", flags="0x0", stats=[
{table="0", match="oxm{gtp_teid="35221864",
ipv4_dst="10.202.233.3", udp_dst="2152", eth_type="0x800", }",
dur_s="486", dur_ns="337000", prio="32768", idle_to="0",
hard_to="0", cookie="0x0", pkt_cnt="149", byte_cnt="50918",
insts=[apply{acts=[ipv4gtp_pop{eth="0x0800"},
set_field{field:eth_src="00:00:00:00:00:02"},
set_field{field:eth_dst="00:e0:8f:0d:88:a8"}, out{port="2"}]}]}.
```

It is noted that, although primarily depicted and described as being performed at step 324, VEPC 240 may install the UL tunnel rule for UE 210 on FE 230 at any time after VEPC 240 receives the UL tunnel information for UL packets to be sent from UE 210 to FE 230 via eNodeB 220.

At steps 325-326, processing is performed in order to enable establishment of one or more dedicated bearers for UE 210. At step 325, VEPC 240 sends a CC-Request (CCR) Command message (e.g., including CC-Request-Type=INITIAL_REQUEST, IP Connectivity Access Network (IP-CAN) Type, RAT Type, and Framed-IP-Address) to PCRF 290. At step 326, PCRF 290 sends a CC-Answer (CCA) Command message (e.g., including QoS-Information, Default-EPC-Bearer-QoS, Event-Trigger, and QoS-Rule-Install,) to VEPC 240. It is noted that steps 325-326 may implement step 14 of Section 5.3.2.1 of 3GPP TS 23.401. It is further noted that the IP-CAN Session Establishment procedure (e.g., as defined in 3GPP TS 23.203) may be performed and, thus, the default PCC rules for UE 210 may be obtained. It is further noted that, although steps 325-326 include processing which may be performed in order to enable establishment of one or more dedicated bearers, descriptions of the actual establishment of the one or more dedicated bearers for UE 210 are omitted for purposes of clarity.

At steps 327-332, a procedure is performed for establishing bearer resources (e.g., including both air and backhaul resources) for the current connection of UE 210. At step 327, VEPC 240 sends an Initial Context Setup message (e.g., including EPS Radio Access Bearer (E-RAB) ID, Message Type, MME UE S1AP ID, eNodeB S1AP ID, UE Aggregate Maximum Bit Rate (AMBR), and System Architecture Evolution (SAE)-Bearers-To-Be-Setup List [e.g., including SAE Bearer ID, SAE Bearer Level QoS parameter(s)]) to eNodeB 220. The Initial Context Setup message informs eNodeB 220 of the destination tunnel information for UL packets from UE 210 to FE 230. At step 328, eNodeB 220 sends an RRC Connection Reconfiguration message (e.g., including NAS Activate Default EPS Bearer Context Request, NAS Attach Accept, and Radio Resource Configuration Information) to UE 210. At step 329, UE 210 sends an RRC Connection Reconfiguration Complete message to eNodeB 220. At step 330, eNodeB 220 sends an Initial Context Setup Response message (e.g., including Message Type, MME UE S1 Application Protocol (S1AP) Identifier, eNodeB UE S1AP ID, SAE Bearer Setup List, SAE Bearer ID, Transport Layer Address, and GTP TEID) to VEPC 240. The Initial Context Setup Response message informs VEPC 240 of the destination tunnel information for DL packets to be sent from FE 230 to UE 210 via eNodeB 220. At step 331, UE 210 sends an UL Information Transfer message (e.g., including an Attach Complete message portion having an ESM Message Container)) to eNodeB 220. At step 332, eNodeB 220 sends an UL NAS Transport message (e.g., including an Attach Complete message portion having an MME UE S1AP ID and an eNodeB ID)) to VEPC 240. It is noted that steps 327-332 may be similar to steps 17-22 of Section 5.3.2.1 of 3GPP TS 23.401.

At step 333, UE 210 sends the first UL data to FE 230 via the UL tunnel established between eNodeB 220 and FE 230 for UE 210. It is noted that, although presented as being performed at step 333, UL data from UE 210 may be propagated from eNodeB 220 to FE 230 via the UL tunnel for UE 210 at any time after establishment of the UL tunnel between eNodeB 220 and FE 230 for UE 210.

At step 334, VEPC 240 installs a DL tunnel rule for UE 210 on FE 230. The VEPC 240 determines that a DL tunnel rule for UE 210 is to be installed on FE 230. The VEPC 240 determines the DL tunnel rule for UE 210, which may include determining DL tunnel information associated with the DL tunnel for which the DL tunnel rule is to be installed. The DL tunnel information describes the DL tunnel rule for UE 210. The DL tunnel information describing the DL tunnel rule may be determined from one or more signalling messages received by VEPC 240. For example, the DL tunnel information may include an S1U DL TEID, an address of UE 210 (e.g., IP address or other suitable address of UE 210), an address of eNodeB 220 (e.g., an IP address or other suitable address of eNodeB 220), a Traffic Flow Template (TFT), and one or more QoS parameters. The VEPC 240 sends the DL tunnel rule to FE 230, which receives and stores the DL tunnel rule for UE 210. The VEPC 240 may send the DL tunnel rule to FE 230 by sending a message that includes a tunnel installation command configured to instruct the FE 230 to install the DL tunnel rule for UE 210. The DL tunnel installed on FE 230 for UE 210 may be used by FE 230 for handling packets received at FE 230 and intended for delivery to UE 210 via eNodeB 220. For example, the DL tunnel installed on FE 230 for UE 210 may instruct the FE 210 to terminate the DL tunnel for UE 210 at FE 230 by encapsulating packets received from DN 250 and intended for UE 210 and forwarding the encapsulated packets toward UE 210 via the DL tunnel between FE 230 and eNodeB 220. The VEPC 240 may send the DL tunnel rule to FE 230 using an SDN protocol (e.g., OpenFlow or other suitable SDN protocol) or an SDN-based or an SDN-like protocol.

In at least some embodiments, an extension of the OpenFlow protocol may be used by VEPC 240 to send the DL tunnel rule for UE 210 to FE 230.

An exemplary message format for a message that uses an extension of an OpenFlow protocol to send the DL tunnel rule to FE 230 follows:

```
00072|tunnel|install new flow 000000000001
"flow_mod{table="0", cmd="add", cookie="0x0", mask="0x0",
idle="0", hard="0", prio="32768", buf="0", port="any",
group="any",
flags="0x1", match=oxm{ipv4_dst="204.178.30.130",
eth_type=0x"800"}, insts=[apply{acts=[gtp_psh{eth="0x0800"},
set_field{field:teid="1033"},
set_field{field:ipv4_src="10.202.233.3"
}, set_field{field:eth_src="00:00:00:00:00:01"},
set_field{field:eth_dst="00:e0:b1:e8:1d:c8"},
set_field{field:ipv4_dst="10.202.117.2"}, out{port="1"}]}]}"
```

It will be appreciated that the exemplary message above instructs FE 230 to maintain a DL tunnel rule indicative that packets sent to the given UE 210 (e.g., having IP address 204.178.30.130) are forwarded toward eNodeB 220 (e.g., having IP address 10.202.117.2).

An exemplary flow rule format for a flow rule that is installed by FE 230 for the DL tunnel of UE 210 based on the exemplary message format above follows:

```
{table="0", match="oxm{ipv4_dst="204.178.30.130",
eth_type="0x800"}", dur_s="352", dur_ns="576000",
prio="32768", idle_to="0", hard_to="0", cookie="0x0",
pkt_cnt="5", byte_cnt="480",
insts=[apply{acts=[ipv4gtp_psh{eth="0x0800"},
set_field{field:gtp_teid="1033", },
set_field{field:ipv4_src="10.202.233.3"},
set_field{field:eth_src="00:00:00:00:00:01"},
set_field{field:eth_dst="00:e0:b1:e8:1d:c8"},
set_field{field:ipv4_dst="10.202.117.2"}, out{port="1"}]}]}}
```

It is noted that, although primarily depicted and described as being performed at step 334, VEPC 240 may install the DL tunnel rule for UE 210 on FE 230 at any time after VEPC 240 receives the DL tunnel information for DL packets to be sent from FE 230 to UE 210 via eNodeB 220 (e.g., as part of the Initial Context Setup Response message received by VEPC 240 at step 330).

At step 335, FE 230 receives the first DL data intended for UE 210 and sends the first DL data to UE 210 via the DL tunnel established for UE 210. It is noted that the DL tunnel for UE 210 is up and running for UE 210 after VEPC 240 installs the DL tunnel rule for UE 210 on FE 230 (e.g., as part of step 334), such that packets received at FE 230 and intended for UE 210 may be forwarded by FE 230 to eNodeB 220 for delivery to UE 210.

It will be appreciated that at least some steps of exemplary message flow 300 of FIGS. 3A-3C may be better understood by way of reference to Section 5.3.2.1 of 3GPP TS 23.401.

It will be appreciated that, although primarily depicted and described with respect to installation of UL and DL tunnel rules into FE 230 in conjunction with an Initial Attach Procedure that is performed when UE 210 requests to attach to LTE communication network 200, similar functions may be used for removal of UL and DL tunnel rules from FE 230 in conjunction with a corresponding Detach Procedure that is performed when UE 210 detaches from LTE communication network 200. For example, VCE 240 may identify one or more tunnel rules (e.g., one or more UL tunnel rules or one or more DL tunnel rules) of UE 210 to be removed from FE 230 and may send one or more messages to FE 230 for causing FE 230 to remove the one or more identified tunnel rules from FE 230.

Figure 4A:
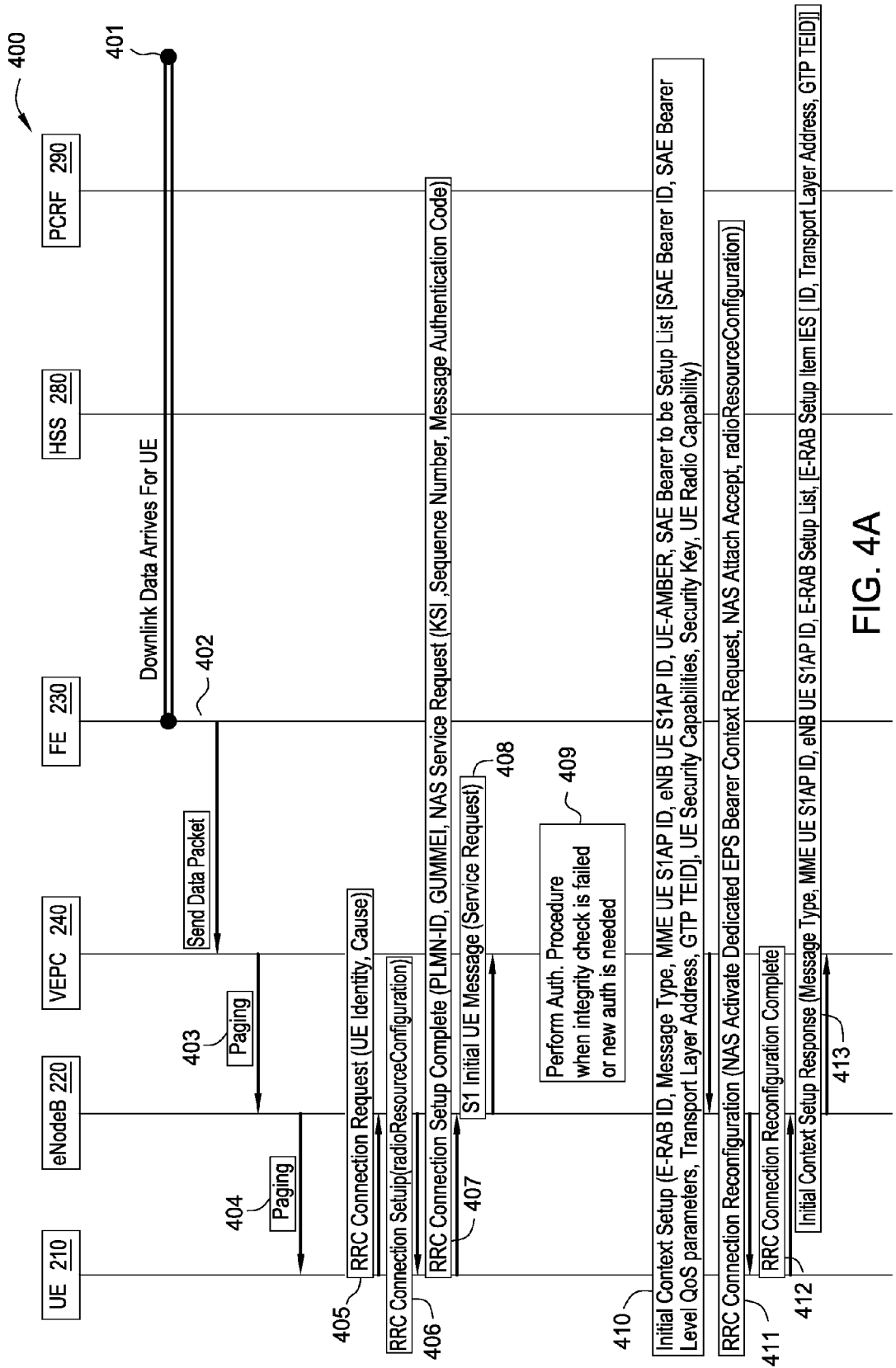
FIGS. 4A-4B depict an exemplary message flow for a Service Request Procedure in the LTE communication system of FIG. 2.
Figure 4B:
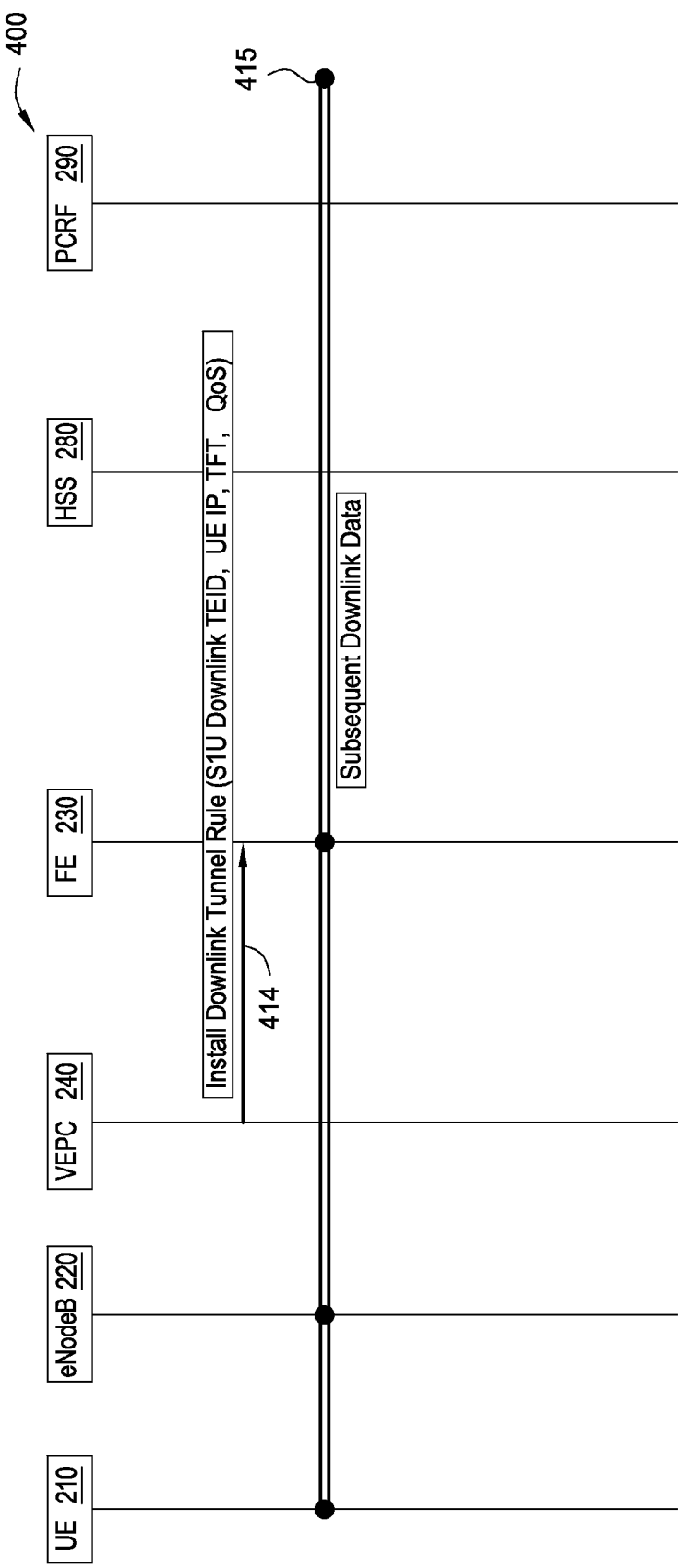

FIGS. 4A-4B depict an exemplary message flow for a Service Request Procedure in the LTE communication system of FIG. 2. In general, the Service Request Procedure may be performed for various reasons. For example, the Service Request Procedure may be used when the network (e.g., PGW) has DL signaling pending, when UE 210 has UL signaling pending, when the network or UE 210 has user data pending and the EMM-mode of UE 210 is in the EMM-IDLE mode (e.g., to transition the EMM mode of UE 210 from the EMM-IDLE mode to the EMM-CONNECTED mode and establish the radio and S1 bearers when UL or DL user data), when UE 210 (while the EMM-mode of UE 210 is in EMM-IDLE mode or EMM-CONNECTED mode) has requested to perform mobile originated/mobile terminated (MO/MT) CS fallback procedures, or the like. It will be appreciated that while the Service Request Procedure is initiated by UE 210, the network provides a network-initiated trigger for causing UE 210 to initiate the Service Request Procedure (e.g., via use of a Paging Procedure) for DL transfer of signaling or user data to UE 210 while the EMM mode of UE 210 is in EMM-IDLE mode. FIGS. 4A-4B depict an exemplary message flow for a network-initiated Service Request Procedure in the LTE communication system 200 of FIG. 2.

At step 401, FE 230 receives a data packet from the data network (omitted for purposes of clarity) and determines that the received data packet is intended for a destination that is unknown to FE 230. The destination address of the data packet is the address of UE 210 (e.g., an IP address of UE 210). The FE 230, however, does not recognize the address of UE 210 in the received data packet, because FE 230 does not currently have a DL tunnel rule for forwarding of DL data intended for UE 210.

At step 402, FE 230 sends the data packet to VEPC 240, thereby triggering VEPC 240 to initiate a process for determining and installing a DL tunnel rule for forwarding of DL data intended for UE 210.

At step 403, VEPC 240 performs a lookup in order to identify UE 210 for which the data packet is intended and, based on a determination that UE 210 is registered with VEPC 240, initiates a Paging Procedure for locating UE 210. The VEPC 240 may identify UE 210 for which the data packet is intended by inspecting the destination address (e.g., IP address) of the data packet, and performing a look-up using a PAA map in order to identify UE 210 for which the data packet is intended. The VEPC 240 may initiate the Paging Procedure by sending a Paging message (e.g., including NAS ID for paging, Tracking Area Identities (TAIs), UE Identity-Based Discontinuous Reception (DRX) Index, Paging DRX Length, and List of Closed Subscriber Group Identities (CSG IDs) for paging) to each eNodeB that belongs to the tracking area(s) in which UE 210 is registered. It will be appreciated that an exemplary Paging Procedure is described in 3GPP TS 36.300 [5] and 3GPP TS 36.413 [36]. It will be appreciated that, for message flow 400 of FIGS. 4A-4B, an assumption is made that UE 210 is registered with VEPC 240.

At step 404, eNodeB 220 pages UE 210 in response to receipt of the Paging message from VEPC 240. It will be appreciated that, although omitted for purposes of clarity, one or more other eNodeBs to which VEPC 240 sends the paging message also may page UE 210, although only eNodeB 220 with which UE 210 is currently associated will receive an associated response from UE 210.

At steps 405-406, UE 210 and eNodeB 220 exchange signaling to set up an RRC connection. At step 405, UE 210 sends an RRC Connection Request message (e.g., including UE Identity and Cause) to eNodeB 220. At step 406, eNodeB 220 sends an RRC Connection Setup message (e.g., including Radio Resource Configuration Information) to UE 210. The setup of an RRC connection in this manner may be better understood by way of reference to Section 5.3.3 of 3GPP TS 36.331.

At step 407, UE 210 sends a NAS Service Request message toward the MME element of VEPC 240 by encapsulating the NAS Service Request message in an RRC Connection Setup Complete message and sending the RRC Connection Setup Complete message to eNodeB 220. The RRC Connection Setup Complete message may include RRC parameters (e.g., the selected network (e.g., PLMN-ID) and GUMMEI) and NAS Service Request parameters (e.g., Protocol Discriminator, Security Header Type, NAS KSI, Sequence Number, and Message Authentication Code). It will be appreciated that the RRC message(s) which may be used to carry the S-TMSI and the Service Request message are described in 3GPP TS 36.300.

At step 408, eNodeB 220 sends the NAS Service Request message to VEPC 240 by encapsulating the NAS Service Request message within an S1 Initial UE Message and sending the S1 Initial UE Message to VEPC 240. The S1 Initial UE Message may include parameters specific to the S1 Initial UE Message (e.g., Message Type, eNodeB UE S1AP ID, NAS Protocol Data Unit (NAS-PDU), TAI, E-UTRAN CGI, S-TMSI, RRC Establishment Cause, and so forth) and NAS Service Request parameters (e.g., including Protocol Discriminator, Security Header Type, NAS KSI, Sequence Number, and Message Authentication Code, as described at step 407).

At step 409, one or more authentication or security procedures may be performed. The one or more authentication or security procedures may be performed when the integrity check fails, when a new authorization is needed, or in response to any other similar conditions. For example, the one or more authentication or security procedures may include NAS authentication/security procedures as defined in Clause 5.3.10 (on "Security Function") of 3GPP TS 23.401.

At step 410, VEPC 240 requests that eNodeB 220 establish the S1 UE context by sending the Initial Context Setup Request message (e.g., including Message Type, MME UE S1AP ID, eNodeB UE S1AP ID, UE Aggregate Maximum Bit Rate, E-RAB to Be Setup List [E-RAB to Be Setup Item IEs [E-RAB ID, E-RAB Level QoS Parameters, Transport layer Address, GTP TEID]], UE Security Capabilities, Security Key, and UE Radio Capability) to eNodeB 220. The EPS Bearer parameters (e.g., QoS Class Index (QCI), Allocation and Retention Priority (ARP), UL TEID, UL IP Address, or the like) for the EPS Bearer(s) to be supported may be retrieved from the consolidated context information maintained by VEPC 240 (e.g., the context as maintained by the MME, SGW, and PGW nodes of the 3GPP LTE network which, in this case, includes the MME, SGW, and PGW elements of VEPC 240) for UE 210.

At steps 411 and 412, eNodeB 220 establishes the Radio Bearer(s), needed to support the EPS Bearer(s), requested in the Initial Context Setup Request message, as well as the measurement configuration to be applied by UE 210. At step 411, eNodeB 220 sends an RRC Connection Reconfiguration message (e.g., including a NAS Activate Dedicated EPS Bearer Context Request, a NAS Attach Accept, radio resource configuration information, or the like) to UE 210. At step 412, UE 210, after reconfiguring itself based on the RRC Connection Reconfiguration message, sends an RRC Connection Reconfiguration Complete message to eNodeB 210.

At step 413, eNodeB 220, after successfully establishing the EPS Radio Bearer(s), sends an Initial Context Setup Response message (e.g., including Message Type, MME UE S1AP ID, eNodeB UE S1AP ID, and E-RAB Setup List [E-RAB Setup Item IEs [E-RAB ID, Transport Layer Address, GTP TEID]]) to VEPC 240. The Initial Context Setup Response message informs VEPC 240 of the DL tunnel information for the DL tunnel to be established between FE 230 and UE 210 for DL tunneling of packets received at FE 230 from the data network and intended for UE 210.

At step 414, VEPC 240 installs a DL tunnel rule for UE 210 on FE 230. The VEPC 240 determines that a DL tunnel rule for UE 210 is to be installed on FE 230. The VEPC 240 determines the DL tunnel rule for UE 210, which may include determining DL tunnel information associated with the DL tunnel for which the DL tunnel rule is to be installed. The DL tunnel information describes the DL tunnel rule for UE 210. The DL tunnel information describing the DL tunnel rule may be determined from one or more signalling messages received by VEPC 240. For example, the DL tunnel information may include an S1U DL TEID, an address of UE 210 (e.g., IP address or other suitable address of UE 210), an address of eNodeB 220 (e.g., an IP address or other suitable address of eNodeB 220), a TFT, and one or more QoS parameters. The VEPC 240 sends the DL tunnel rule to FE 230, which receives and stores the DL tunnel rule for UE 210. The VEPC 240 may send the DL tunnel rule to FE 230 by sending a message that includes a tunnel installation command configured to instruct the FE 230 to install the DL tunnel rule for UE 210. The DL tunnel installed on FE 230 for UE 210 may be used by FE 230 for handling packets received at FE 230 and intended for delivery to UE 210 via eNodeB 220. For example, the DL tunnel installed on FE 230 for UE 210 may instruct the FE 210 to terminate the DL tunnel for UE 210 at FE 230 by encapsulating packets received from DN 250 and intended for UE 210 and forwarding the encapsulated packets toward UE 210 via the DL tunnel between FE 230 and eNodeB 220. The VEPC 240 may send the DL tunnel rule to FE 230 using an SDN protocol (e.g., OpenFlow or other suitable SDN protocol) or an SDN-based or an SDN-like protocol.

At step 415, FE 230 sends DL data packets to UE 210 via the DL tunnel established for UE 210. It is noted that the DL data packets sent from FE 230 to UE 210 via the DL tunnel established between FE 230 and eNodeB 220 for UE 210 include DL data packet buffered at FE 230 (e.g., buffered between the time when the first data packet is received at step 401 and when the DL tunnel is installed on FE 230 at step 414) as well as any subsequent DL data packets received at FE 230 and intended for delivery to UE 210.

It will be appreciated that, although omitted for purposes of clarity, UL tunneling of data packets from UE 210 to FE 230 via eNodeB may be performed at any time following step 410. Namely, since the UL tunnel endpoint for UE 210 at FE 230 is still valid since the time of attachment (e.g., as depicted and described in message flow 300 of FIGS. 3A-3C), and the same tunnel information is communicated to eNodeB 220 at step 410 of message flow 400 of FIGS. 4A-4B, any data packets propagated from UE 210 toward DN 250 via eNodeB 220 may be routed to DN 250 by FE 230 before the DL tunnel for UE 210 is established on FE 230.

It will be appreciated that at least some steps of exemplary message flow 400 of FIGS. 4A-4B may be better understood by way of reference to Sections 5.3.4.1 and 5.3.4.3 of 3GPP TS 23.401.

It will be appreciated that, although primarily depicted and described with respect to installation of a DL tunnel rule into FE 230 in conjunction with a Service Request Procedure that is performed when a service is provided to UE 210 from DN 250 (e.g., where a device associated with DN 250 propagates data intended for delivery to UE 210), similar functions may be used for removal of DL or UL tunnel rules from FE 230 in conjunction with a corresponding Service Termination Procedure that is performed when the service being provided is terminated. For example, VCE 240 may identify one or more tunnel rules (e.g., one or more DL tunnel rules or one or more UL tunnel rules) of UE 210 to be removed from FE 230 and may send one or more messages to FE 230 for causing FE 230 to remove the one or more identified tunnel rules from FE 230.

It will be appreciated that, although primarily depicted and described with respect to embodiments in which the VCE determines a tunnel rule to be installed on the FE and sends the tunnel rule to the FE for storage on and use by the FE, one or more other embodiments may be supported. In at least some embodiments, the VCE may determine the tunnel rule to be installed on the FE and send the tunnel rule to the FE (where the tunnel rule is sent by the VCE in a first format), and the FE may receive the tunnel rule from the VCE, process the received tunnel rule to convert the tunnel rule from the first format into a second format (e.g., a flow rule format supported by an SDN-based protocol, an SDN-like protocol, or the like), and store the tunnel rule in the second format for use by the FE. In at least some embodiments, the VCE may determine tunnel rule information for the tunnel rule to be installed on the FE and send the tunnel rule information to the FE, and the FE may receive the tunnel rule information, determine or generate the tunnel rule for the tunnel based on the tunnel rule information, and store the tunnel rule for use by the FE. In such embodiments, the VCE may be said to be configured to initiate installation of the tunnel rule on the FE, to cause installation of the tunnel rule on the FE, or the like.

It will be appreciated that, although primarily depicted and described with respect to embodiments in which installation of tunnel rules into FE 230 or removal of tunnel rules from FE 230 is performed based on specific conditions (e.g., the Network Attach Procedure presented with respect to FIGS. 3A-3C, a Network Detach Procedure related to FIGS. 3A-3C, the Service Request Procedure presented with respect to FIGS. 4A-4B, or a Service Termination Procedure related to FIGS. 4A-4B), installation of tunnel rules into FE 230 or removal of tunnel rules from FE 230 may be performed based on various other conditions. For example, installation of tunnel rules into FE 230 or removal of tunnel rules from FE 230 may be performed in conjunction with one or more of movement of UE 210 from a current eNodeB to a new eNodeB, movement of UE 210 from an old VEPC to a new VEPC, an Emergency Attach Procedure initiated by UE 210, a dedicated bearer activation procedure performed for UE 210, connection of UE 210 to more than one APN or PDN, or the like. Accordingly, a more general embodiment for installation of tunnel rules into FE 230 or removal of tunnel rules from FE 230, for UL or DL tunnels, is presented in FIG. 5.

Figure 5:
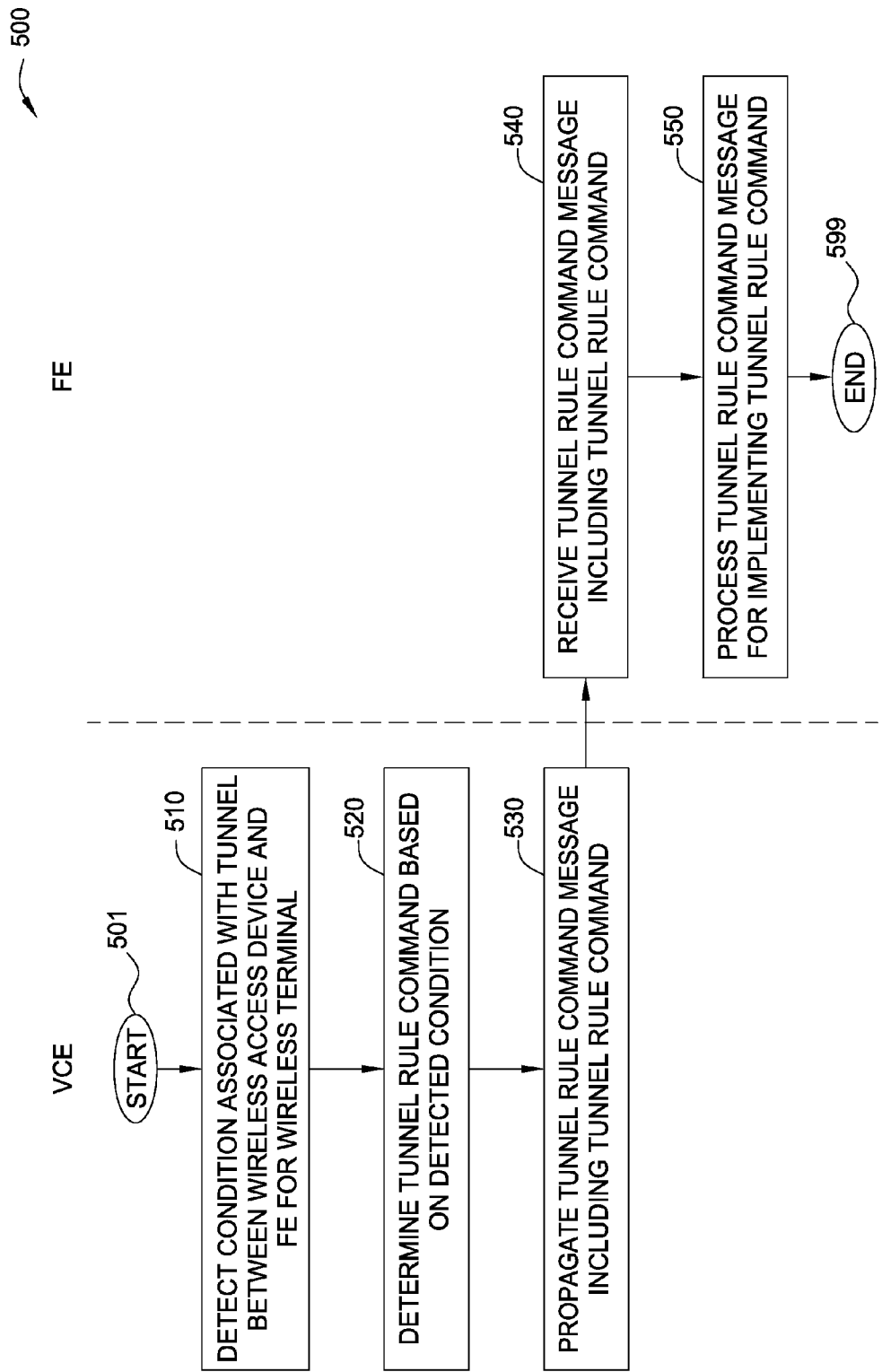
FIG. 5 depicts a high-level block diagram of a method for supporting virtualization of control plane functions of a wireless core packet network for various types of conditions and services.

FIG. 5 depicts a high-level block diagram of a method for supporting virtualization of control plane functions of a wireless core packet network for various types of conditions and services. The virtualization of control plane functions of the wireless core packet network is performed by a VCE that is configured to control the operation of an FE of the wireless core packet network in providing data plane functions of the wireless core packet network. It will be appreciated that, although primarily depicted and described with respect to control over data forwarding for a single wireless terminal (WT) that is accessing the wireless core packet network via an associated wireless access device (WAD), method 500 of FIG. 5 may be applied for controlling data forwarding of any WTs accessing the wireless core packet network functions provided by the VCE and the FE. It will be appreciated that, although primarily depicted and described as being performed serially, at least a portion of the steps of method 500 may be performed contemporaneously, or in a different order than presented in FIG. 5.

At step 501, method 500 begins.

At step 510, the VCE detects a condition associated with a tunnel between the WAD and the FE for the WT. The condition may be establishment or termination of the tunnel between the WAD and the FE for the WT. The condition may be initiation of establishment or termination of the tunnel between the WAD and the FE for the WT. The condition may be an indication that the tunnel is to be established or terminated between the WAD and the FE for the WT. The condition may be associated with an initial attachment by the WT to WAD, receipt of a service request associated with the service to be provided for the WT, or the like. The condition may be indicated by messaging received by the VCE as part of typical messaging associated with control plane functions performed by the VCE (e.g. such as where the VCE exchanges messages with other control elements in conjunction with an Initial Attach Procedure (e.g., as presented in FIGS. 3A-3C)) or by messaging received by VCE as specific messaging configured to cause the VCE to initiate control plane functions performed by the VCE (e.g., such as where the FE sends a message which causes the VCE to perform a Service Request Procedure (e.g., as presented in FIGS. 4A-4B)). The condition may be any other suitable type of condition which may indicate to the VCE that one or more tunnel rules is to be added or removed from the FE.

At step 520, the VCE determines a tunnel rule command based on the detected condition. The tunnel rule command may include more or more of a command that a tunnel rule is to be installed on the FE (and associated tunnel rule information describing the tunnel rule to be installed) or a command that a tunnel rule is to be removed from the FE. The tunnel rule command may include the tunnel rule for the tunnel (in a format to be used on the FE or in a format that is not to be used on the FE), tunnel information for use by the FE in determining or generating the tunnel rule, or the like. The tunnel rule to be installed or removed may be an UL tunnel rule related to an UL tunnel from the WAD to the FE for the WT or a DL tunnel rule related to a DL tunnel from the FE to the WAD for the WT.

At step 530, the VCE propagates a tunnel rule command message to the FE. At step 540, the FE receives the runnel rule command message from the VCE. The tunnel rule command message provides an indication of the tunnel rule command from the VCE to the FE. The tunnel rule command message may provide an indication as to whether a new tunnel rule is to be installed on the FE or an existing tunnel rule is to the removed from the FE.

At step 550, the FE processes the tunnel rule command message for implementing the tunnel rule command indicated in the tunnel rule command message. The processing of the tunnel rule command message may include (1) when the tunnel rule command includes the tunnel rule for the tunnel, storage of the tunnel rule on the FE, (2) when the tunnel rule command includes the tunnel rule for the tunnel in a first format and the tunnel rule is to be maintained on the FE in a second format, conversion of the tunnel rule from the first format to the second format and storage of the tunnel rule on the FE in the second format, or (3) when the tunnel rule command includes the tunnel rule information for use in determining the tunnel rule, determination of the tunnel rule based on the tunnel rule information and storage of the tunnel rule on the FE. This results in storage of the tunnel rule for the WT on the FE.

At step 599, method 500 ends.

It will be appreciated that, although primarily presented within the context of embodiments in which a tunnel rule for a WT is installed on the FE or removed from the FE, in at least some embodiments a tunnel rule for a WT may be modified on the FE. The modification of an existing tunnel rule for a WT on the FE may include sending tunnel information adapted for use by the FE in modifying the existing tunnel rule, sending a tunnel command adapted to instruct the FE to remove the existing tunnel rule and replace it with a new tunnel rule (e.g., where the new tunnel rule is the modified version of the existing tunnel rule), or the like, as well as various combinations thereof. In at least some embodiments, modification of an existing tunnel rule may be triggered by the movement of the WT from a current WAD to a target WAD, which can either be served by the same FE or be served by a different FE, with the DL tunnel information for the new tunnel provided in the handover indication message from the target WAD to the VCE. In the former case in which the current and target WADs are served by the same FE, only the DL tunnel rule is modified at the FE while the UL tunnel rule remains intact. In the latter case in which the current and target WADs are served by different FEs, new UL and DL tunnels may be set up at the target FE and the tunnel information for the new UL tunnel is communicated to the target WAD in the handover response message.

It will be appreciated that, although primarily presented within the context of embodiments in which a tunnel is associated with a WT, in at least some embodiments a tunnel may be associated with a particular bearer of the WT (e.g., multiple tunnels or sets of tunnels may be maintained by the FE for multiple bearers of the WT). In at least some embodiments, for example, a data packets sent from a WT via a given bearer of the WT may be tunneled from the WAD supporting the WT to the FE via a UL tunnel specific to the bearer of the WT. In at least some embodiments, for example, a data packet that is received by the FE from a PDN (e.g., the Internet) and that satisfies certain conditions (e.g., the data packet is intended for a given bearer of a WT and does not match a tunnel rule for the bearer of the WT (and, thus, may be said not to match the bearer)) is forwarded from the FE to the VCE, thereby triggering establishment of the bearer for the WT between the FE and the WAD supporting the WT and associated installation of a DL tunnel for the bearer for the WT.

It will be appreciated that, although primarily presented within the context of a wireless communication system in which a single VCE controls a single FE, in at least some embodiments a single VCE may control multiple FEs, multiple VCEs may control a single FE, a set of multiple VCEs may control a set of multiple FEs, or the like.

It will be appreciated that, although primarily presented within the context of a specific type of wireless communication system (namely, a Long Term Evolution (LTE) wireless communication system), various embodiments of the capability is provided for virtualizing control plane functions of a wireless core packet network may be provided in various other types of wireless communication systems.

Various embodiments of the capability for virtualizing control plane functions of the wireless core packet network without virtualizing data plane functions of the wireless core packet network enable the data traffic to remain on the native transport network without routing the data traffic through the VMs of the virtual environment used to provide the control plane functions, thereby conserving resources of the virtual environment while also optimizing the latency of the data connections in the data plane.

Various embodiments of the capability for virtualizing control plane functions of the wireless core packet network without virtualizing data plane functions of the wireless core packet network enable various aspects of the control and data portions of the wireless core packet network to be managed individually. For example, capacity planning for the control plane and data plane portions of the wireless core packet network may be handled individually, thereby allowing control plane functions to be scaled when needed without scaling data plane functions and, similarly, allowing data plane functions to be scaled when needed without scaling control plane functions. In other words, the wireless network provider is able to grow the wireless core packet network separately for the signaling and user planes. This is advantageous, as it is quite difficult (if not impossible) to predict the rates at which control traffic and data traffic will increase within the wireless core packet network and it is unlikely that the rates at which control traffic and data traffic will increase will be the same.

Various embodiments of the capability for virtualizing control plane functions of the wireless core packet network enable the functionalities of multiple nodes of the wireless core packet network to be merged, thereby enabling a fewer number of states (or perhaps even only a single state) to be maintained for a given UD at the VCE, such that signaling transactions that are typically required between such multiple nodes of the wireless core packet network (i.e., in the absence of embodiments of the capability for virtualizing control plane functions of the wireless core packet network) may be reduced or even minimized.

Figure 6:
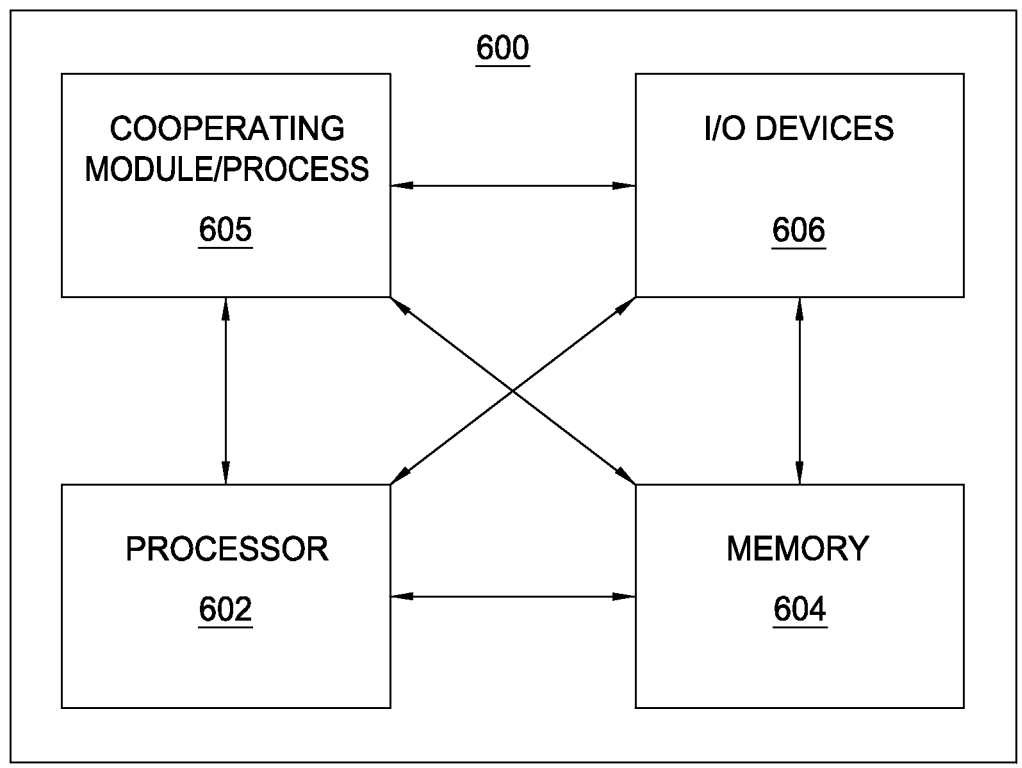
FIG. 6 depicts a high-level block diagram of a computer suitable for use in performing functions described herein.

FIG. 6 depicts a high-level block diagram of a computer suitable for use in performing functions described herein.

The computer 600 includes a processor 602 (e.g., a central processing unit (CPU) or other suitable processor(s)) and a memory 604 (e.g., a random access memory (RAM), a read only memory (ROM), or the like) that is communicatively connected to the processor 602.

The computer 600 also may include one or more input/output devices 606 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, or the like.

It will be appreciated that computer 600 depicted in FIG. 6 provides a general architecture and functionality suitable for implementing functional elements described herein or portions of functional elements described herein. For example, computer 600 provides a general architecture and functionality suitable for implementing WT 110, AN 120, FE 130, VCE 140, one or more elements of DN 150, UE 210, eNodeB 220, FE 230, VEPC 240, one or more elements of DN 250, HSS 280, PCRF 290, various portions of any of the foregoing elements, or the like, as well as various combinations thereof.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, while the foregoing is directed to various embodiments of features present herein, other and further embodiments may be devised without departing from the basic scope thereof.

What is claimed is:

1. A virtual control element (VCE), comprising:
a set of virtual machines (VMs) configured to provide a set of control plane functions of a wireless core packet network, at least one of the VMs configured to:
detect a condition associated with a tunnel, for a wireless terminal (WT), between a forwarding element (FE) of the wireless core packet network and a wireless access device (WAD) configured to serve the WT; and
propagate, toward the FE, a message comprising a tunnel command configured to instruct the FE to install, remove, or modify a tunnel rule associated with the tunnel between the FE and the WAD;
wherein the condition comprises detection of receipt of a signaling message for the tunnel, wherein the tunnel is an uplink (UL) tunnel from the WAD to the FE, wherein the at least one of the VMs is configured to:
determine, based on receipt of the signaling message for the UL tunnel, tunnel information associated with the UL tunnel from the WAD to the FE; and
include, within the tunnel command, the tunnel information associated with the UL tunnel from the WAD to the FE.

2. The VCE of claim 1, wherein the set of control plane functions of the wireless core packet network comprises at least one of a session management function, a data forwarding control function, or a mobility management function.

3. The VCE of claim 1, wherein the condition associated with the tunnel between the FE and the WAD comprises at least one of:
a condition associated with establishment of the tunnel between the FE and the WAD;
a condition associated with termination of the tunnel between the FE and the WAD;
a condition associated with a request by the WT to attach to the WAD;
a condition associated with a service to be provided for the WT;
a condition associated with movement of the WT from a previous WAD to the WAD or from the WAD to a new WAD;

a condition associated with movement of the WT from a previous VCE to the VCE or from the VCE to a next VCE;
a condition associated with initiation of an emergency attach procedure by the WT;
a condition associated with a dedicated bearer activation performed for the WT; or
a condition associated with attachment of the WT to more than one data network.

4. The VCE of claim 1, wherein the tunnel command includes the tunnel rule for storage on the FE or the tunnel command includes tunnel rule information configured for use by the FE in determining the tunnel rule.

5. The VCE of claim 1, wherein the tunnel rule associated with the tunnel comprises a rule indicative that the FE, in response to receiving a data packet from the WT, decapsulate the data packet and forward the data packet toward a data network associated with the WT.

6. The VCE of claim 1, wherein the signaling message comprises information indicative of a packet data network (PDN) toward which data packets from the WT are to be sent.

7. The VCE of claim 1, wherein the tunnel information comprises at least one of an S1U Uplink Tunnel Endpoint Identifier (TEID), a Packet Data Network (PDN) Identifier, or at least one Quality-of-Service (QoS) parameter.

8. The VCE of claim 1, wherein the at least one of the VMs is configured to generate or propagate the tunnel command based on Software Defined Networking (SDN).

9. A virtual control element (VCE), comprising:
a set of virtual machines (VMs) configured to provide a set of control plane functions of a wireless core packet network, at least one of the VMs configured to:
detect a condition associated with a tunnel, for a wireless terminal (WT), between a forwarding element (FE) of the wireless core packet network and a wireless access device (WAD) configured to serve the WT; and
propagate, toward the FE, a message comprising a tunnel command configured to instruct the FE to install, remove, or modify a tunnel rule associated with the tunnel between the FE and the WAD;
wherein the condition comprises detection of receipt of a signaling message for the tunnel, wherein the tunnel is a downlink (DL) tunnel from the FE to the WAD, wherein the at least one of the VMs is configured to:
determine, based on receipt of the signaling message for the DL tunnel, tunnel information associated with the DL tunnel from the FE to the WAD; and
include, within the tunnel command, the tunnel information associated with the DL tunnel from the FE to the WAD.

10. The VCE of claim 9, wherein the signaling message comprises tunnel information of the WAD for the DL tunnel from the FE to the WAD.

11. The VCE of claim 9, wherein the set of control plane functions of the wireless core packet network comprises at least one of a session management function, a data forwarding control function, or a mobility management function.

12. The VCE of claim 9, wherein the condition associated with the tunnel between the FE and the WAD comprises at least one of:
a condition associated with establishment of the tunnel between the FE and the WAD;
a condition associated with termination of the tunnel between the FE and the WAD;
a condition associated with a request by the WT to attach to the WAD;
a condition associated with a service to be provided for the WT;
a condition associated with movement of the WT from a previous WAD to the WAD or from the WAD to a new WAD;
a condition associated with movement of the WT from a previous VCE to the VCE or from the VCE to a next VCE;
a condition associated with initiation of an emergency attach procedure by the WT;
a condition associated with a dedicated bearer activation performed for the WT; or
a condition associated with attachment of the WT to more than one data network.

13. The VCE of claim 9, wherein the tunnel command includes the tunnel rule for storage on the FE or the tunnel command includes tunnel rule information configured for use by the FE in determining the tunnel rule.

14. The VCE of claim 9, wherein the tunnel rule associated with the tunnel comprises a rule indicative that the FE, in response to receiving a data packet intended for the WT, encapsulate the data packet and forward the data packet toward the WAD.

15. The VCE of claim 9, wherein the tunnel information comprises at least one of an S1U Downlink Tunnel Endpoint Identifier (TEID), an address of the WT, an address of the WAD, a Traffic Flow Template (TFT), or at least one Quality-of-Service (QoS) parameter.

16. The VCE of claim 9, wherein the at least one of the VMs is configured to generate or propagate the tunnel command based on Software Defined Networking (SDN).

17. A virtual control element (VCE), comprising:
a set of virtual machines (VMs) configured to provide a set of control plane functions of a wireless core packet network, at least one of the VMs configured to:
detect a condition associated with a tunnel, for a wireless terminal (WT), between a forwarding element (FE) of the wireless core packet network and a wireless access device (WAD) configured to serve the WT; and
propagate, toward the FE, a message comprising a tunnel command configured to instruct the FE to install, remove, or modify a tunnel rule associated with the tunnel between the FE and the WAD;
wherein the condition comprises detection of a message, from the FE, indicative that the FE does not recognize a destination address of a data packet received at the FE from a data network, wherein the at least one of the VMs is configured to:
determine, based on the destination address of the data packet, that the data packet is intended for delivery to the WT;
determine that the tunnel has been established for the WT, wherein the tunnel is a downlink (DL) tunnel; and
include, within the tunnel command, tunnel information associated with the DL tunnel from the FE to the WAD.

18. The VCE of claim 17, wherein the set of control plane functions of the wireless core packet network comprises at least one of a session management function, a data forwarding control function, or a mobility management function.

19. The VCE of claim 17, wherein the condition associated with the tunnel between the FE and the WAD comprises at least one of:
a condition associated with establishment of the tunnel between the FE and the WAD;

a condition associated with termination of the tunnel between the FE and the WAD;
a condition associated with a request by the WT to attach to the WAD;
a condition associated with a service to be provided for the WT;
a condition associated with movement of the WT from a previous WAD to the WAD or from the WAD to a new WAD;
a condition associated with movement of the WT from a previous VCE to the VCE or from the VCE to a next VCE;
a condition associated with initiation of an emergency attach procedure by the WT;
a condition associated with a dedicated bearer activation performed for the WT; or
a condition associated with attachment of the WT to more than one data network.

20. The VCE of claim 17, wherein the tunnel command includes the tunnel rule for storage on the FE or the tunnel command includes tunnel rule information configured for use by the FE in determining the tunnel rule.

21. The VCE of claim 17, wherein the tunnel rule associated with the tunnel comprises a rule indicative that the FE, in response to receiving a data packet intended for the WT, encapsulate the data packet and forward the data packet toward the WAD.

22. The VCE of claim 17, wherein the tunnel information comprises at least one of an S1U Downlink Tunnel Endpoint Identifier (TEID), an address of the WT, an address of the WAD, a Traffic Flow Template (TFT), or at least one Quality-of-Service (QoS) parameter.

* * * * *